United States Patent [19]

Judd et al.

[11] Patent Number: 5,376,279

[45] Date of Patent: Dec. 27, 1994

[54] FILTRATION USING IONICALLY AND ELECTRICALLY CONDUCTIVE DEPTH FILTER

[75] Inventors: Simon J. Judd, Osmington; George S. Solt, Emberton, both of England

[73] Assignee: British Technology Group Ltd., London, England

[21] Appl. No.: 75,856

[22] Filed: Jun. 11, 1993

Related U.S. Application Data

[63] Continuation of Ser. No. 659,388, May 5, 1991, abandoned.

[30] Foreign Application Priority Data

Sep. 12, 1988 [GB] United Kingdom ............... 8821270
Sep. 12, 1988 [GB] United Kingdom ............... 8821271

[51] Int. Cl.$^5$ .................... C02F 1/28; B01D 17/06
[52] U.S. Cl. ............................. 210/681; 95/63; 96/58; 204/152; 204/299 R; 210/243; 210/263; 210/748; 210/799
[58] Field of Search .............. 55/528; 96/58, 79, 83; 95/63; 210/243, 263, 505, 508, 510.1, 748, 767, 661, 681, 683, 799; 428/280, 408; 204/149, 152, 186, 299 R, 302, 305

[56] References Cited

U.S. PATENT DOCUMENTS

| 385,145 | 6/1888 | Siebel | 204/152 |
|---|---|---|---|
| 2,573,967 | 11/1951 | Hamlin | 210/243 |
| 3,324,026 | 6/1967 | Waterman | 210/243 |
| 3,933,643 | 1/1976 | Colvin et al. | 210/243 |
| 4,382,866 | 5/1983 | Johnson | 210/748 |
| 4,562,014 | 12/1985 | Johnson | 261/64.1 |
| 4,776,962 | 10/1988 | Wakeman | 210/243 |
| 4,898,783 | 2/1990 | McCullough et al. | 428/280 |
| 4,902,561 | 2/1990 | McCullough et al. | 428/280 |
| 4,902,563 | 2/1990 | McCullough et al. | 428/408 |
| 5,151,198 | 9/1992 | McCullough et al. | 210/243 |

FOREIGN PATENT DOCUMENTS

| 2244414 | 3/1973 | Germany | 204/302 |
|---|---|---|---|
| 2315615 | 10/1974 | Germany | 204/302 |
| 791618 | 12/1980 | U.S.S.R. | 204/302 |
| 889035 | 12/1981 | U.S.S.R. | 204/302 |
| 939402 | 6/1982 | U.S.S.R. | 210/748 |
| 1104112 | 7/1984 | U.S.S.R. | 204/302 |

OTHER PUBLICATIONS

Published Article by N. C. Lockhart, "Electrical Separations-A Colloid Perspective", Published in Filtration & Separation May/Jun. 1978 (pp. 211-214).
WO, A, 8202003 (Johnson) 24 Jun. 1982.

Primary Examiner—Joseph W. Drodge
Attorney, Agent, or Firm—Cushman, Darby & Cushman

[57] ABSTRACT

A method of depth filtration of particles from a fluid carrying particles including providing in a deep filter a quantity of filter medium elements, at least some of the elements being ionically conductive, applying an electric field to the deep filter to cooperate with individual the elements, permitting or causing said fluid with particles to flow into the deep filter, influencing the movement of particles in the deep filter by the electric field to enhance the filtration of the particles from the fluid. Suitable elements are polyacrylic fibers treated with caustic soda to modify the surface charge, where the electrical conductivity of the fibers vary within individual fibers and between different fibers. The application also concerns an apparatus where the filter medium is supported by a plastic mesh. Disc electrodes permit drinking water to be purified.

28 Claims, 5 Drawing Sheets

FILTRATION USING IONICALLY AND ELECTRICALLY CONDUCTIVE DEPTH FILTER

This is a continuation of application Ser. No. 07/659,388, filed on Mar. 5, 1991, now abandoned.

BACKGROUND OF THE INVENTION

1. Field of the Invention

This invention relates to filtration and more particularly to the enhancing of filtration by electrical action.

The design of a filter to remove particles from a fluid must be a compromise between the obstruction the filter produces in the desired flow of the fluid and the efficiency of removal of particles from the fluid. It is known that in certain circumstances the action of a filter can be enhanced by the application of an electric field. An enhanced filter might for example offer less obstruction for a given removal of particles than the unenhanced version. Clearly the choice of parameter enhanced in any given filter, subject to design constraints, can be a matter of choice.

The way in which electrical action enhances filter action is believed to be understood for certain distinct classes of filter and electrical action.

2. Description of the Related Art

One very important filter is the deep-bed filter in which the spaces are large compared with the size of the particles to be filtered and the filter medium is relatively loosely packed. The pore volume can be 20 to 30% or even more. A significant use of deep-bed filters is depth filtration for drinking water supplies. In this a relatively deep layer or bed of filter medium, such as sand, is used to adsorb particles on the surface of the medium with minimal pressure loss in the passage of the water through the relatively open filter. While such a filter is effective in removing many of the particles small particles tend to follow the hydraulic streamlines and pass through the filter medium.

SUMMARY OF THE INVENTION

It is an object of the invention to provide a method of electrically enhanced filtration of particles from a fluid and an electrically enhanced filter structure, to improve the removal of small particles.

According to the invention there is provided a method of depth filtration of particles from a fluid carrying particles including providing in a deep filter a quantity of filter medium elements, at least some of the elements being ionically conductive, applying an electric field to said deep filter to cooperate with individual said elements, permitting or causing said fluid with particles to flow into the deep filter, influencing the movement of particles in the deep filter by the electric field to enhance the filtration of the particles from the fluid.

The term "ion conductive" refers to a mechanism in which thee conduction is predominantly by ions, rather than by electrons and holes. The latter mechanism is electrical conduction and is referred to simply as conduction.

In such methods of depth filtration the filter medium elements may have an electrical conductivity varying from one part to another of the element. The one and another part may be regions of a fibre and there may be several said parts in each fibre. Conveniently the fibres are manufactured fibres having within them one or more conductive parts of discontinuous longitudinal regions. One preferred fibre is the proprietary fibre ACTILEX B701 (RTM) a polyacrylic material, as recently available from Courtaulds Ltd.

The filter medium elements may be permitted or caused to have a specific state of charge, not the same as that of the particles to be filtered. Specifically the elements may be chemically treated, e.g. with NaOH, to have a charge opposite to that of the particles. The elements may be permitted or caused to imbibe water.

The deep filter type is well-known in the art and is characterised by a filter medium of a bed or layer of significant depth but open structure to have a high porosity. In a deep filter embodying the invention the porosity may be such that in the absence of the electric field particles could move through without encountering the filter medium.

According to the invention there is also provided a method of depth filtration including providing in quantity a filter medium of elements having an electrical conductivity varying from one part to another of said elements, forming a quantity of said elements into a deep filter, applying an electric field to cooperate with individual said elements in the deep filter, permitting or causing fluid with particles for filtration therefrom to flow Into the deep filter, influencing the movement of particles in the deep filter by the cooperation of said applied electric field and said individual elements to enhance the filtration of said particles from the fluid.

According to another aspect of the invention there is provided a deep filter including filter medium arranged in filter layer, means to apply an electric field to the layer and means to move through the layer a liquid with particles for filtration, the filter medium being ion conductive.

Conveniently the filter medium is composed of fibres loosely packed to provide a high porosity ranging to in excess of 96% and up to 96.75% pore volume. The ion conductivity of an individual fibre may not be uniform from part to part of the fibre. Non-uniform conductivity can be provided by the fibres not being all of one type.

When the filter medium is of loosely packed fibres the fibres may be mainly in two of the three conventional orthogonal directions. It may then be advantageous for the means to move the liquid to direct the liquid generally in the third of said three directions.

The filter medium may be polyacrylic fibres chemically modified to be set with electropositive groups.

BRIEF DESCRIPTION OF THE DRAWINGS

Embodiments of the invention will now be described with reference to the accompanying drawings and tables in which FIGS. 4 and 5 are graphs useful in comparing the behaviour of a filter embodying the invention with other filters.

Table 1 is a table of parameter ranges for the filter,

Tables 2 and 3 are tables useful in understanding the behaviour of the filter, and Table 4 is a table useful in comparing the behaviour of a filter embodying the invention with other filters.

DETAILED DESCRIPTION OF THE PRESENTLY PREFERRED EXEMPLARY EMBODIMENTS

Figure 1:
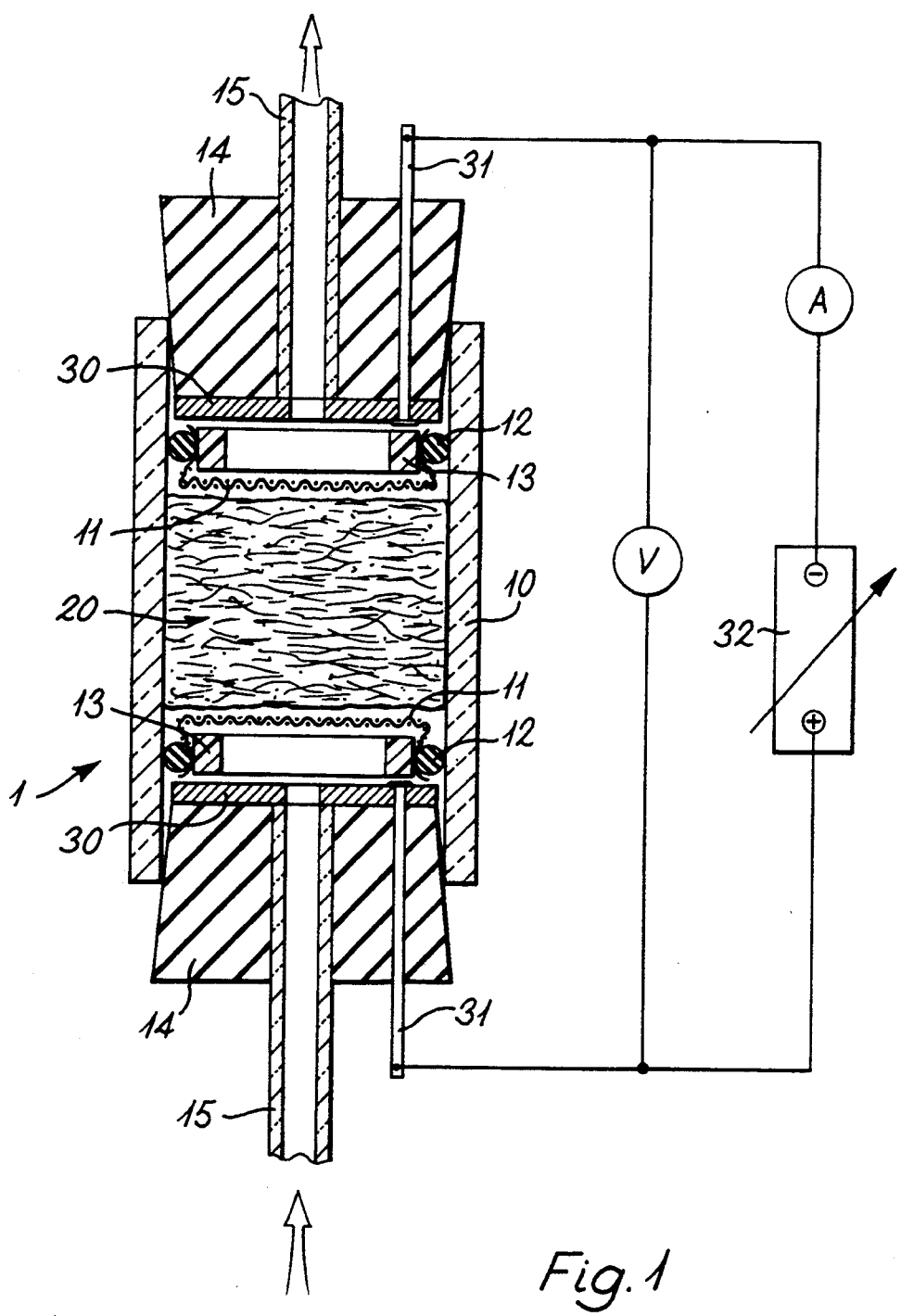
FIG. 1 is a schematic diagram, partly in cross-section, of a filter structure embodying the invention.

Referring first to FIG. 1 this shows in schematic form an experimental form of a filter embodying the invention.

A deep-bed filter indicated generally as 1 is formed in tube 10 of acrylic material (specifically PERSPEX, RTM). The filter medium 20 is of fibres and is described in more detail below. The filter medium 20 is held in the tube 10 by two similar retainers formed of plastic meshes 11 (conveniently of NETLON, R.T.M.) attached to O-rings 12 and supports 13. The tube 10 is closed by similar closures 14 at each end. Each closure has a liquid flow tube 15 extending through it. Each closure also supports a disc electrode 30 and an insulated electrical connection 31 for the electrode. Conveniently the electrodes are of platintsed titanium and the connection is of an insulated copper wire extending through the electrode. An adjustable source of electricity 32, with voltmeter 33 and ammeter 34, is connected to the connections 31. In this embodiment the source is of continuous, i.e. d.c., current, In this way an electrical field of desired strength can be applied in the filter. In one arrangement the tube 10 was about 35 millimetres in diameter and a filter length of about 10 to 25 and typically 15 millimetres was used.

The fibres and filter medium will now be described in more detail.

The fibres were supplied by Courtaulds, under the trade name "Actilex B701", and had a mean diameter of 25.81 micrometers ±1.46 micrometers as determined by optical microscopic measurement of the cross section. The fibre density was calculated from the decitex measurement in g/10$^6$ cm supplied by the manufacturer. The available pore volume was calculated from specific gravity measurements of the wet and dry material.

The fibre was pre-treated by stirring a 0.4% slurry in NaOH for 5 hours before use to rid it of residual hydrochloric acid from the manufacturing process, and also to convert the ion-exchanging surface to the hydroxide form. The fibre zeta($\zeta$)-potential was calculated from streaming potential measurements of fibre plugs using apparatus similar to that of Joy et al (1965). Measurements were corrected for surface conduction by the method of Fairbrother and Mastin (1924). The axial conductivity of the fibre was measured by the alternating current impedance method on continuous filaments of the material.

A buffer system of $2 \times 10^{-4}$M trishydroxymethylmethylamine: $10^{-4}$M HCl was used. The measured conductivity of this buffer was 8 to $9 \times 10^{-6} \Omega^{-1}$ cm$^{-1}$. The water was supplied from an Elga (RTM) R03 deionisation unit which produced water of conductivity $0.5 \times 10^{-6} \Omega^{-1}$ cm$^{-1}$.

The filter medium was formed in place in the tube 10. The filter pad was formed on the lower retainer by sedimentation of the pre-treated fibres from a 4% slurry in the buffer solution. Fibre settlement was assisted by mechanical agitation using a modified Griffin and George mechanical shaker, which also helped remove trapped air bubbles, such that the fibres usually settled within 30 minutes. The supernatant was drained and the upper retainer placed in the cell to compress the fibre pad to the required filter length.

Prior to filtration the fibre pad was equilibrated by passage of 250 ml buffer solution through the cell. The electrical supply was connected and the field set at the required strength and the test material suspension flowed upwards through the cell (as shown in the drawing) at the desired flow rate from a constant head device.

The performance of the filter was measured using a test material of an aqueous suspension of homodispersed polystyrene latex particles.

The polystyrene latex particles were prepared by emulsion polymerisation according to the method of Kotera et al (1970). The initiator used was potassium persulphate and, in the case of the sub-micron particles, sodium lauryl sulphate was used as a surfactant. After fractionation of the suspensions, by sedimentation or centrifugation, particles of mean diameter 0.432, 1.13 and 2.09 micrometers respectively were obtained. These were then purified using nuclear grade ion-exchange resins (Rohm and Haas) according to the method of Van den Hull and Vanderhoff (1972). Particle diameters were determined using a model "T" Coulter counter (Coulter, Luton) or, In the case of the smallest particles, electron microscopy. The particle electrophoretic mobilities were determined using a Rank Mk II microelectrophoresis apparatus (Rank Bros., Bottisham, Cambridge) fitted with a flat cell.

The filtrate particle concentration was monitored nephelometrically using a Camlab Ratio Turbidimeter (Camlab, Cambridge) fitted with a flow-through cell. The meter was pre-calibrated to give direct proportionality between the turbidity reading and the particle concentration. Filter efficiency is designated $\eta$, with suffix D,E,I,G respectively for diffusional, electrophoretic, interceptional, gravitational capture.

The range of experimental parameters used in the study is given in Table 1.

Figure 2:
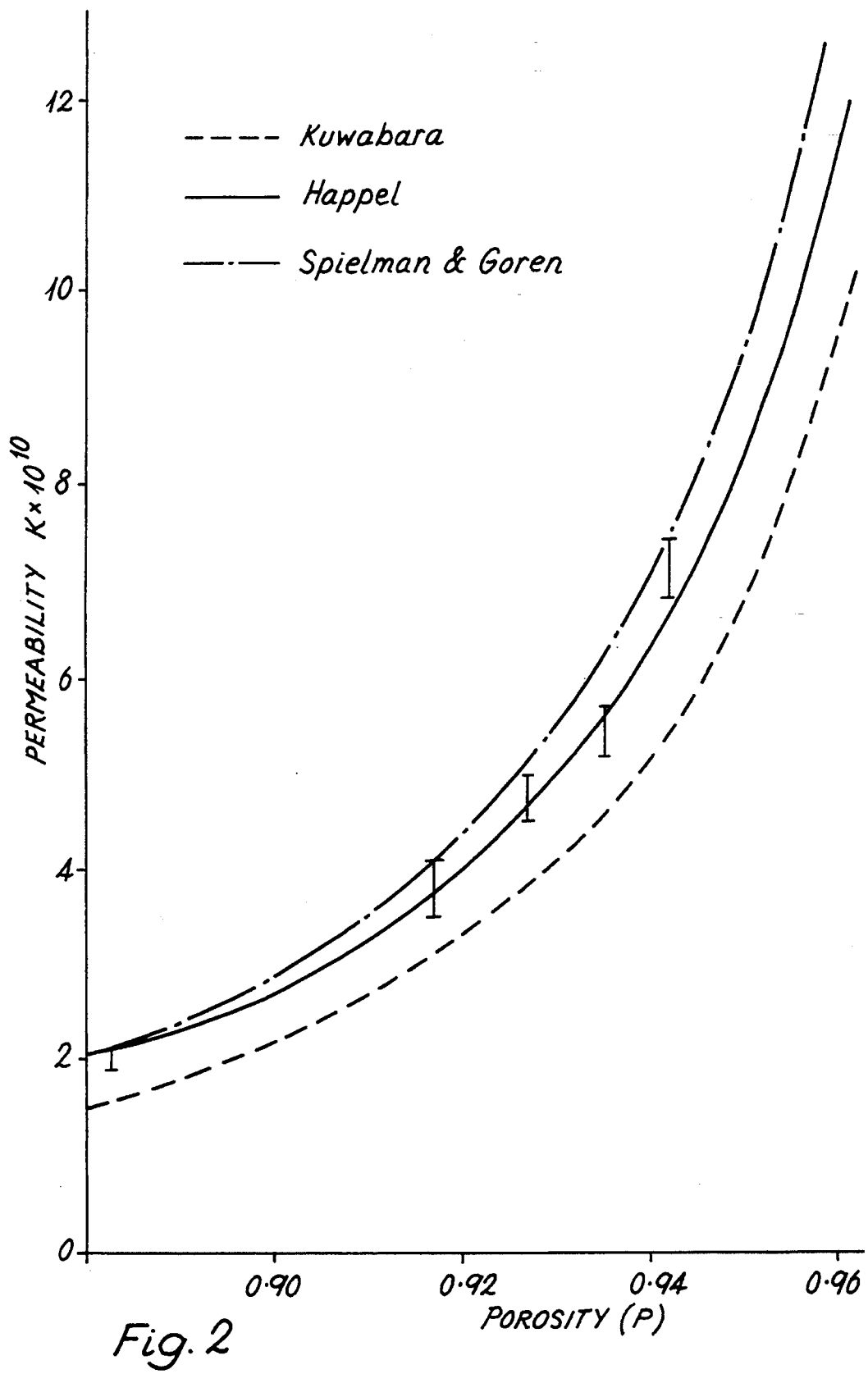
FIGS. 2, 3a, 3b, 3c and 4 are graphs useful in understanding the behaviour of the filter.

FIG. 2 shows the permeability values obtained for a fibre bed compressed to five different porosities, with comparison predicted values. The experimental data are in good agreement with those predicted by Happel, whose model yields a flow parameter:

$$A_F = 1/[-\ln\alpha - 1 + \alpha^2/(1+\alpha^2)] \quad (01)$$

This expression for $A_F$ was used in all subsequent calculations of the single fibre efficiency, $\alpha$ is the volumetric packing density.

In order to calculate $\eta$ from consideration of the microscopic particle deposition onto the collector surface it is necessary to model the fluid flow through the filter medium. The models of Happel (1965), Kuwabara (1959) and Spielman and Goren (1968) are all based on creeping flow conditions for an array of cylindrical collectors randomly orientated transverse to the fluid flow. Under these conditions, when fluid inertia is negligible, D'Arcy's law is obeyed:

$$U = K\Delta P/\mu L \quad (02)$$

where U is the approach velocity of the fluid, K is the permeability, $\Delta P$ is the pressure drop across the filter and $\mu$ is the fluid viscosity.

The permeability is related to the packing density, according to the respective models, by:

$$K_{Happel} = a_F^2(-\ln\alpha - 1 + \alpha^2/(1+\alpha^2))/8\alpha \quad (03)$$

$$K_{Kuwabara} = a_F^2(-\ln\alpha + 2 - \alpha^2/2 - 1.5)/8\alpha \quad (04)$$

$$a_{Spiel/Gor} = 2 + 4K_1(\beta)/K_{zero}(\beta) \quad (05)$$

where $\beta = K^{-1/2} a_F$ and $K_{zero}$ and $K_1$ are Bessel functions of the zero and first order respectively, $a_F$ is the fibre radius.

The zeta($\zeta$)-potential values calculated from the particle mobility and fibre bed streaming potential data are given in Table 2. The standard deviations for mobility measurements were less than 8 for the smallest particles and less than 5 for the two larger particles. Although the mobility measurements taken for suspensions sampled "in-situ" at the entrance of the filter bed were much less homogeneous, they were generally in reasonable agreement with these "ex-situ" values. Deviations of greater than 10% occurred only as a result of excessive electrode polarisation, thereby increasing in the ionic strength sufficiently to produce an increase in the particle $\zeta$-potential by counter-ion adsorption. This effect was only significant at field strength to linear flow rate ratios of greater than 900 V cm$^{-2}$s$^{-1}$.

Non-electrophoretic filtration performance is considered first. Under the conditions employed (see Table 1) the $\eta_C/\eta_I$ ratios were approximately 2:1, 1:1 and 1:2 for the particle radii of 0.216, 0.565 and 1.05 micrometers respectively. Equations from Natanson (1957a), Langmuir (1942) and Stechina et al (1969) respectively for diffusion (D), interception (I) and gravitation (G) were used In calculating the theoretical collector efficiency. The classical value for interception (Langmuir 1942) was modified to include the effects of van der Haal's attraction and hydrodynamic retardation according to the predictions of Natanson (1957b) or, where appropriate, the computations of Spielman and Fitzpatrick (1973). According to Natanson, the modified collector efficiency for capture by interception is given by $$\eta_{Im} = \eta(3\ N_{Ad}/4)^{\frac{1}{2}} \quad (06)$$

where $N_{Ad}$ is the dimensionless adhesion number $Qa_F^2/9\mu a_p A_F U$ and Q is the Hamaker constant, estimated from the work of Hough and White (1980) to be $0.91 \times 10^{-20}$J. Although this explicit expression is adequate at high adhesion numbers, when $N_{Ad} < 1$ it is more accurate to use the Spielman and Fitzpatrick solution.

The results (Table 2) indicate an increase in $\eta_{exp}/\eta_{DiG}$ with particle size. This is in qualitative agreement with the computations of Adamczyk and van de Ven, who predict an increase in capture over the classical value in the presence of double layer attraction at high Peclet numbers. The relevant data is summarised in Table 2. According to Adamczyk and van de Ven, capture is expected to increase with the double layer number $N_{D1}$ and the modified Peclet number $Pe_m$, and decrease with increasing $a_p$, the particle radius to double layer thickness ratio. As $Pe_m$ is proportional to $a_p^4$ this enhanced capture effect becomes significant for large particles in solutions of low ionic strength. Note $\eta_{exp}$ is the experimental results.

Turning now to electrophoretically-assisted filtration it was found that the collector efficiency for capture by electrophoretic transport, $\eta_E$, was independant of filter history in the range of conditions employed. This was checked by increasing flow rate by increments of 10 ml min$^{-1}$ every 4 to 6 minutes during the course of a run, allowing the outlet turbidity to reach equilibrium for each flow rate, and then reverting to the original flow rate. In 90% of the runs where this method was applied $\eta_{init} = \eta_{end} \pm 5\%$. Further experiments at constant field and flow rate showed $\eta_E$ to increase by less than 10% over 500 ml of suspension passed and less than 5% over 200 ml. This allowed several isopotential measurements to be taken at a number of flow rates in the course of a single run.

Plots were made to correlate $\eta_E$ with $N_E$ (the electric field) according to the following equations:

$$\eta_E = mN_E \quad (07)$$

$$\eta_E = mN_E/(1+N_E) \quad (08)$$

$$\eta_E = mN_E/(1-mN_E) \quad (09)$$

where m is the electrophoretic capture coefficient and where $\eta_E = \eta_{exp} - \eta_{DIG}$; i.e. non-electrophoretic capture is assumed to be given by the calculated theoretical collector efficiency, ignoring the effect of the double layer attractive force. As the experimentally measured electrophoretic capture efficiency values were generally large in comparison to those obtained in the absence of an electric field, the error induced by this assumption is small.

Figure 3A:
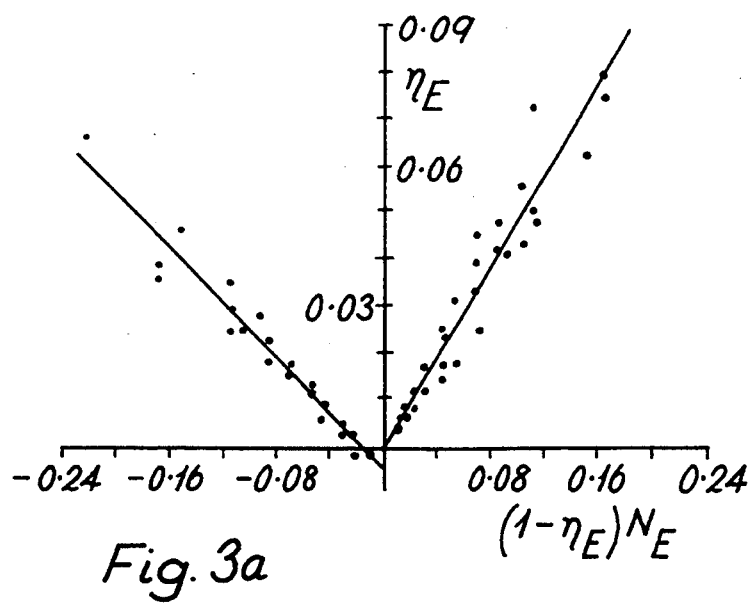
Figure 3B:
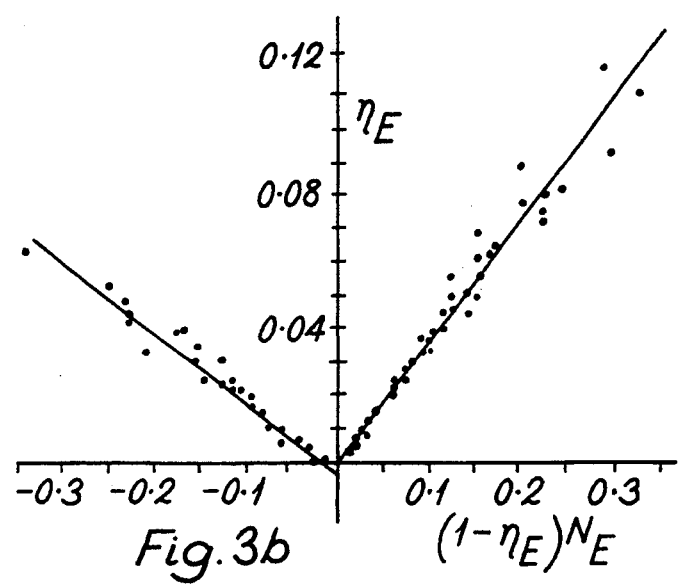
Figure 3C:
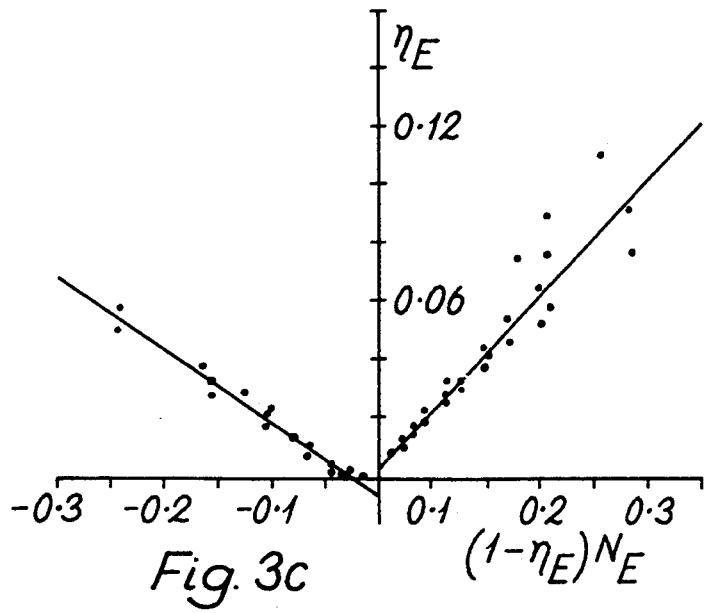

The statistical analyses of the plots are given in Table 3, and the data from equation 09, chosen because of its more consistent intercept values concerning electrophoretic transport values plotted against electric field values are shown in FIGS. 3a, 3b, and 3c which relate respectively to particles of 0.216, 0.565, 1.05 micrometer diameter. The results at high $N_E$ values are scattered to too great an extent to establish which, if any, of these equations fits the data exactly. However, as $\eta_E$ cannot exceed unity equation (07), analagous to the expression of Stechina and co-workers for capture by sedimentation at $R << 1$, cannot fully describe capture if the electrophoretic or settling velocity exceeds that of the fluid. At low $N_E$ values $\eta_E$ approaches m$N_E$ where the coefficient m=0.32-0.44 for positive (co-flow) fields and 0.22-0.29 for negative (counter-flow) fields. Capture appears to show some particle size and/or particle charge dependency.

For capture by gravitational or electrostatic forces. m=1 according to classical theory, confirmed empirically for positive gravity in aqueous media by Fitzpatrick and Spielman (1973). In the same study it was found that capture by negative gravitation was some 500 times greater than that predicted by theory [Spielman and Fitzpatrick (1973)]. The current study suggests that when an electrophoretic force opposes fluid flow $\eta_E$ reaches a minimum between $N_E=0$ and $-0.02$. At values of $\eta_E$ exceeding $\eta_{DIG}$, $\eta_E$ increases linearly with $N_E$ at a rate approximately 60% that of positive fields.

There is insufficient data to allow correlation between the coefficient m and the size and charge of the particle. However the results indicate that, under the experimental conditions imposed, capture by electrokinetic transport is a factor of 2–3 lower than that predicted by analogy with gravitation or aerosol deposition under a coulombic force. There are several mechanisms that could contribute to the divergance, which have so far been examined only cursorily if at all.

Tentative experimental studies using citrate to poison the fibre surface have shown that a reduction in the surface charge has little effect on $\eta_E$ as long as the fibre remains oppositely charged to the particles. The discrepancy between deposition by sedimentation and electrophoresis cannot therefore be explained by electroosmotic motion of the fluid at the fibre surface shear plane. Under the same conditions, reducing the particle surface charge using cetyltrimetyhlammonium bromide (CTAB) caused a very significant reduction in the electrophoretic collector efficiency.

Throughout this treatment it has been assumed that fibre polarisation does not affect particle capture. Alternating current studies have shown the ionic conductivity of the fibre to be an order of magnitude greater than that of the electrolyte used in the filtration experiments. This implies that the fibre should have a significantly higher permittivity than the fluid surrounding It, and thus capture should be enhanced according to Zebel (1965). However, it is questionable that coulombic forces could alter the particle trajectory in colloidal suspensions. In liquids surface charges are compensated by the diffuse part of the double layer, such that the associated electrical forces act over only very short distances.

Specific gravity measurements revealed that the fibre has a fractional pore volume of 0.05. Optical microscopic studies showed that the fibre has a large degree of surface roughness, and therefore only approximates to a perfect cylindrical collector. Furthermore, its conductivity, although significantly higher than that of the suspension electrolyte, is at least two orders of magnitude lower than would be expected of a homogeneous ion-exchange resin of equivalent ion-exchange capacity. This suggests that the fibre is chemically heterogeneous with an uneven distribution of quaternary ammonium functional groups throughout the fibre material. The effect of such a material on the applied field cannot be predicted.

The above describes particle capture by a fibrous filter in the presence and absence of an external electric field. The field was applied parallel to the the fluid flow in both the co-flow (positive field) and counter-flow (negative field) directions. The fibres of the filter, by way of example polyacrylic, are preferably chemically modified to be set with electropositive groups. ACTILEX fibres are believed to be those described in European Published Patent Application 0 194 766 A1.

In the absence of an applied field the measured values of the single fibre efficiency are in reasonable agreement with those predicted by theory, if the influence of double-layer attractive forces is taken into account.

In positive fields the electrophoretic capture efficiency $\eta_E$ follows a trend qualitatively analogous to classical sedimentation or electrostatic aerosol deposition, $\eta = mu_p/U$ where $u_p$ is the particle velocity induced by the applied force. However, the analogy is not quantitative, the values for electrophoretic deposition being a factor of 2 to 3 lower than the theoretical values, where $m = 1$ in each case. This was attributed to the observed fibre heterogeneity.

In negative fields, $\eta_E$ minimises at low negative field strengths and then follows the same relationship as positive fields but with a reduced proportionality factor m. No extensive empirical study of particle capture by negative sedimentation has been carried out in the past, but the results for negative fields are in qualitative agreement with the observations of Fitzpatrick and Spielman (1973). The relation of field and flow direction may be important. Even better filtration may occur when the field is across the flow. It is believed that the values given for factor m include the effect of ohmic resistance at the filter supports but this affects all measurements similarly. An estimate of this effect is a multiplier of 2–3 for m.

The electrophoretic fibre efficiency was found to be independent of filter history under the conditions employed in the study and dependent to a small extent on the size and/or surface charge of the particle.

The influence of the fibre conductivity on the filter performance is more difficult to assess. It is certain that a fibre of different conductivity to the medium surrounding it will induce a deviation in the electric field In the vicinity of the fibre. The extent to which this can affect the particle transport and deposition has not previously been investigated either theoretically or empirically in the case of liquid depth filtration, even though there is a long history of research into this aspect of aerosol filtration.

Accordingly three other fibres were characterised with respect to their surface charge and bulk conductance, and their respective efficiencies compared to that of the anionic Actilex B701 fibre. The fibres were Courtelle (RTM) (a polyacrylic fibre of zero bulk conductivity), 12 k High Modulus carbon fibre of very high electrical conductivity, and a cationic ion-exchange fibre of comparatively high ionic conductivity, Actilex A801. Well characterised negatively charged polystyrene latex particles were used throughout.

The apparatus and conditions described above were used except that the surfactant used to adjust the surface charge of the fibres was "Percol 1597", a polypyrollidine polyelectrolyte. CTAB was found to adsorb reversibly on the fibre surface and was therefore not used in these measurements.

Approximate zeta-potential values, calculated from $\Delta P:E_s$ plots are given in the first half of Table 4 for all fibres, some of which are base materials modified by the adsorption of the polyelectrolyte. The fibre conductivities are shown in the same table. The latter refer to the ratio of the actual fibre plug conductivity to that predicted in the absence of any fibre conductance [Fairbrother and Mastin (1926)]. The carbon fibre has an immeasurably large $K_{meas}/K_{pred}$ value—a 10 mm plug at a packing density of approximately 15% has a resistance of only 2 ohms. This means that the fibre has a negligible zeta potential, because the plug offers no resistance to a potential difference set up across it. The surface charge of the carbon fibre can therefore not be determined by this method. However, it seems probable that a fibre of substantial bulk conductivity will not undergo charge reversal on saturating with any surfactant because of its large density of charge carrying groups. This is demonstrated by the cationic Actilex A801 fibre, which remains weakly negative on saturation with the polyamide. In the case of Courtelle such charge carrying groups are probably less highly charged and more thinly distributed.

Figure 4:
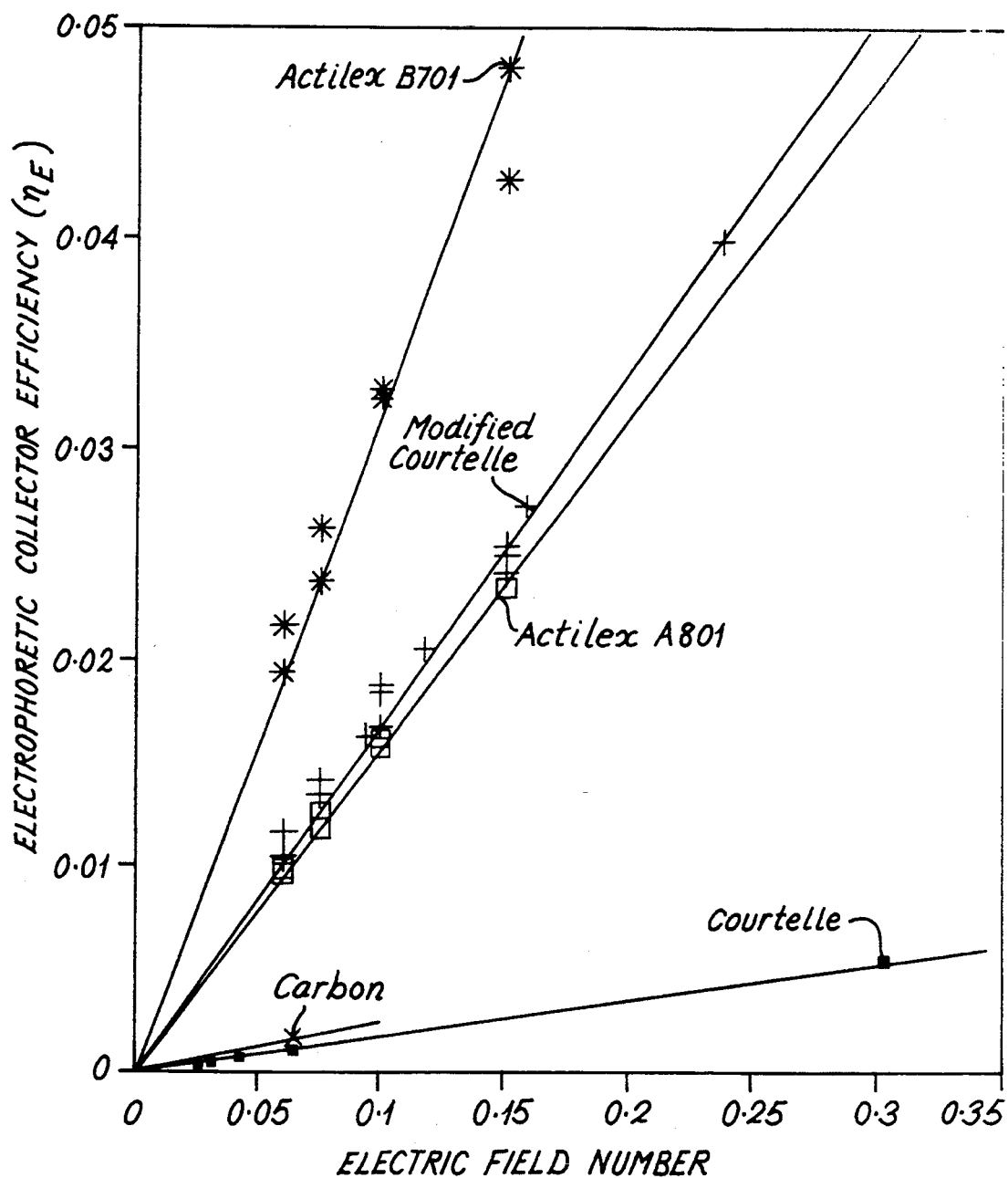

The filtration data is summarised in Table 4, and the electrophoretic capture data shown graphically in FIG. 4. In the absence of an external field it can be seen that both the modified Courtelle fibre and the anionic ton-exchange fibre Actilex B701 approximate to a perfect sink. This may have been predicted from the streaming potential data, indicating positively charged surfaces for the respective fibres. All other fibres are negatively charged and this is reflected in their low measured capture efficiencies, both with and without an applied electric field.

The most interesting aspects of the results are:
(a) The ubiquity with which the equation $\eta_E = mu_e/U = mN_E$ appears to apply, (where $u_e$ is the electrophoretic velocity of the particle and U the approach velocity of the fluid), (b) The significant improvement in the efficiency on reversing the surface charge using the polyelectrolyte, (c) The ineffectiveness of carbon fibre as an electrophoretic filter fibre, even though the "field absent" result is not unreasonably low (see table), (d) The marked similarity between the electrophoretic performance of Courtelle and the cationic fibre Actilex A801. It appears that a very high fibre electrical conductivity actually impairs electrophoretic filtration. On the other hand, Actilex A801 is significantly conducting but still responds almost identically to an electric field as modified Courtelle, which is an insulator.

It is evident that the excessively low resistance of the carbon fibre breaks down the field across the fibre plug, even at the high bed porosities used in the filtration experiments (96.75% void space)and preferably 95% to 96% in a range down to 90%.

Figure 5:
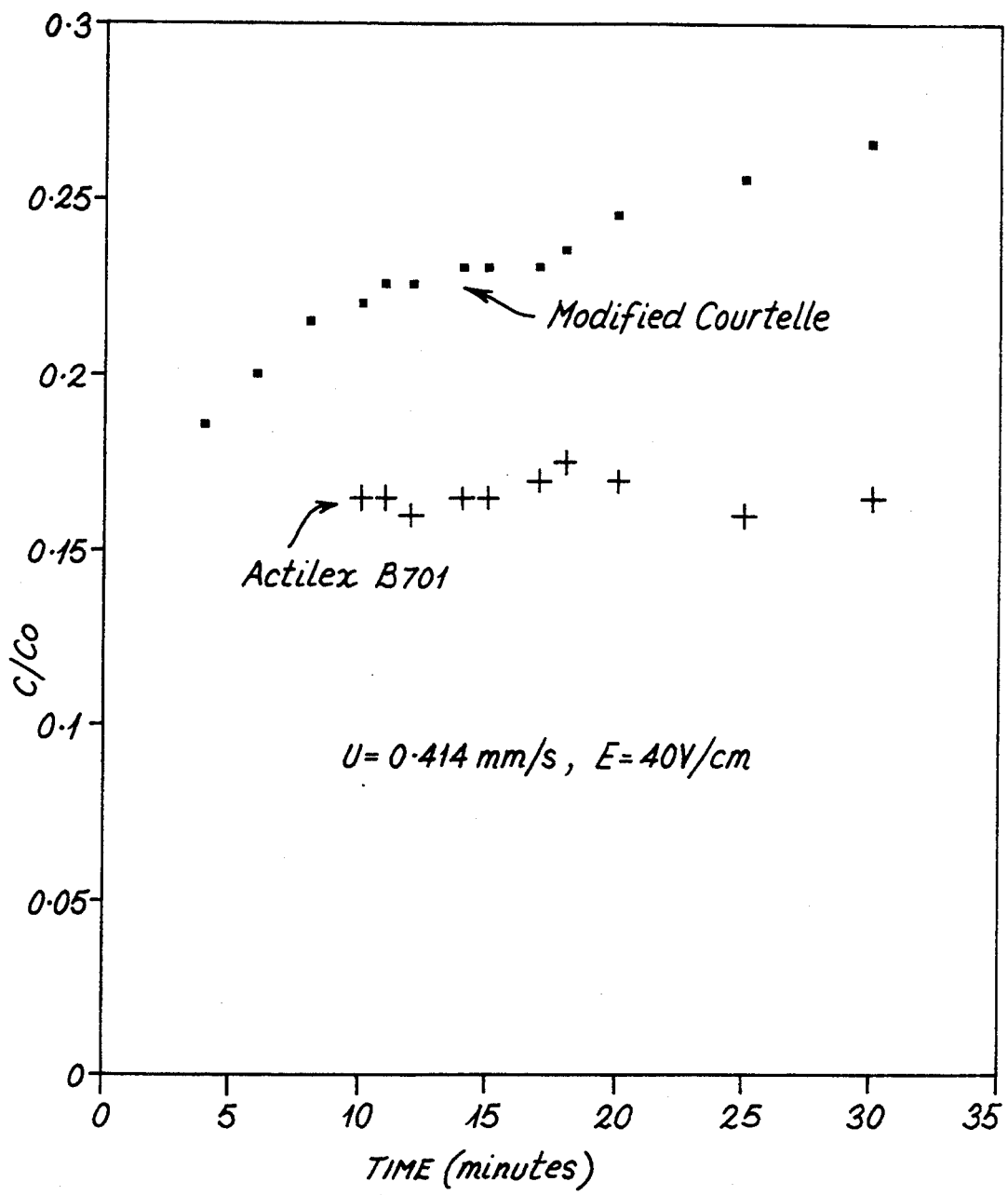

Notably, the transient response of an electrophoretic depth filter composed of the ion-exchange materials differs noticeably to that of Courtelle (FIG. 5). The filtrate concentration remains almost unchanged over a period of 30 minutes for both the ion-exchangers. A gradual increase in the filtrate concentration with time occurs with Courtelle under the same conditions. The anionic fibre Actilex B701, from the slopes in FIG. 4, clearly has a collector efficiency significantly greater than the other fibres although Courtelle and Actilex A801 when surface modified show behaviour which might be useful.

While the reasons for the unexpected filter efficiency of the Actilex B701 fibre are not known for certain the efficiency has been demonstrated by the above examples.

It appears that there may be some property pertaining to the Actilex B701 fibre that makes it very suitable for use in electrophoretic depth filters. It is possible that the Actilex A801 fibre may have some usefullness for such filters. The enhanced performance over fibres of similar surface charge characteristics, and therefore similar field-absent filter properties, is evidenced by a doubling of the electrophoretic collector efficiency and a less time-dependent filtrate concentration.

It is possible that the higher efficiency of the Actilex fibres is a consequence of either their ionic conductivity or their permittivity. Although the ionic conductivity of these fibres is by no means large, they at least will not actively obstruct the passage of ions through the filter bed, in the way that an insulator must. It Is quite possible that any fibre that retains an appreciable amount of water (Actilex B701 imbibes 50% of its own weight of water) will respond in the same way. A significantly large fibre dielectric constant, compared to that of the surrounding water, would also be expected to enhance the electrokinetic capture. However, interfacial dielectric relaxation, due to the electrical double layer, is actually far more significant than that of the bulk material [Einol and Carstenen (1971)]. As similar dielectric behaviour would be expected from any charged fibre in aqueous media [Schwarz (1962)] one would not expect on this basis the marked difference in the results from the Courtelle and the Actilex fibres.

The values of the electric field appear from the results but it should be noted that fields of above some 4000 $V/m^{-1}$ may cause polarisation and gassing which could inhibit the filter action.

Earlier patents describe various filter structures and materials, for example U.S. Pat. No. 4,350,590 (Robinson), U.S. Pat. No. 4,594,138 (Thompson) and UK published Application 2198365. However none of these refer to anionic fibres In an applied electric field as set out herein.

TABLE 1

| | Ranges of parameter values | |
|---|---|---|
| | Non-electrophoretic | Electrophoretic |
| $c_o(m^{-3})$ | 0.018–3.00 × 1014 | |
| $\alpha$ | 0.0325 | |
| $U$ (ms$^{-1}$) | 2.07 × 10$^{-4}$ | 4.14–10.36 × 10$^{-4}$ |
| $L$ (m) | 0.012–0.036 | 0.012 |
| Pe | 5550–27000 | 11100–135000 |
| Pe$_m$* | 0.00249–1.39 | 0.00498–6.96 |
| E (Vm$^{-1}$) | — | 429–4290 |

*modified Peclet number according to Adamczyk and van de Ven, Pe$_m$ = 2PeA$_F$R$^3$.

TABLE 2

Non-electrophoretic filtration and electrokinetic data

| | $a \times 10^6$ (m) | $\eta_{exp}$ | $\eta_{DIG}$ (i) | $\frac{\eta_{exp}}{\eta_{DIG}}$ | $m_e \times 10^8$ (m$^2$s$^{-1}$v$^{-1}$) | $\zeta$ (mv) (ii) | $\kappa a_p$ (iii) | $N_{Dl}$ (iv) |
|---|---|---|---|---|---|---|---|---|
| Particles | 0.216 | 0.00933 | 0.01054 | 0.885 | 2.31 | −33 | 7.06 | 167 |
| | 0.0565 | 0.00839 | 0.00799 | 1.050 | 3.14 | −45 | 18.5 | 562 |
| | 1.05 | 0.01029 | 0.00826 | 1.245 | 3.35 | −48 | 34.2 | 1110 |
| Fibre | 26.4 | — | — | — | — | +9 | — | — |

(i) $\eta_{DIG} = \eta_D + \eta_I + \eta_G$
(ii) From uncorrected Smoluchowski equation $\zeta = m_e/\epsilon\epsilon_o$
(iii) $\kappa$ = Debye-Huckel parameter
(iv) $N_{Dl}$ = dimensionless double layer number according to Adamczyk and van der Ven, $4\pi\epsilon\epsilon_o\zeta p_{\zeta p}^a p/kT$ Table 3

Statistical analyses of electrophoretic filtration data

| | | Equation:plot | | | | | | | | | | | |
|---|---|---|---|---|---|---|---|---|---|---|---|---|---|
| | | (07): $\eta_E$ vs. $N_E$ | | | | (08): $\eta_E$ vs. $N_E/(1 + N_E)$ | | | | (09): $\eta_E$ vs. $N_E(1 − \eta_E)$ | | | |
| $a_P$ (μm) | Polarity | m | $10^4\eta_{E,o}$ | r | $\frac{m_+}{m_-}$ | m | $10^4\eta_{E,o}$ | r | $\frac{m_+}{m_-}$ | m | $10^4\eta_{E,o}$ | r | $\frac{m_+}{m_-}$ |
| 0.216 | + | 0.4422 | 10.51 | 0.9615 | 1.60 | 0.5209 | −10.79 | 0.9642 | 1.57 | 0.4775 | 1.73 | 0.9595 | 1.64 |
| (Fig. 3a) | − | 0.2759 | −38.01 | 0.9806 | | 0.3325 | −55.08 | 0.9791 | | 0.2908 | −43.03 | 0.9788 | |
| 0.565 | + | 0.3199 | 17.06 | 0.9786 | 1.56 | 0.4359 | −27.58 | 0.9815 | 1.71 | 0.3694 | 1.06 | 0.9769 | 1.68 |
| (Fig. 3b) | − | 0.2046 | −43.17 | 0.9768 | | 0.2548 | −64.04 | 0.9803 | | 0.2205 | −52.40 | 0.9849 | |

Table 3-continued

Statistical analyses of electrophoretic filtration data

| | | Equation:plot | | | | | | | | | | | |
|---|---|---|---|---|---|---|---|---|---|---|---|---|---|
| | | (07): $\eta_E$ vs. $N_E$ | | | | (08): $\eta_E$ vs. $N_E/(1 + N_E)$ | | | | (09): $\eta_E$ vs. $N_E(1 - \eta_E)$ | | | |
| $a_P$ (μm) | Polarity | m | $10^4 \eta_{E,o}$ | r | $\frac{m_+}{m_-}$ | m | $10^4 \eta_{E,o}$ | r | $\frac{m_+}{m_-}$ | m | $10^4 \eta_{E,o}$ | r | $\frac{m_+}{m_-}$ |
| 1.05 | + | 0.3934 | 23.07 | 0.9641 | 1.68 | 0.5086 | −24.87 | 0.9582 | 1.74 | 0.4423 | 2.81 | 0.9539 | 1.80 |
| (Fig. 3c) | − | 0.2336 | −40.73 | 0.9862 | | 0.2196 | −62.07 | 0.9859 | | 0.2464 | −46.11 | 0.9857 | | m = gradient, $\eta_{E,o}$ = intercept, r = correlation coefficient

TABLE 4

| | Summary of data | | | | |
|---|---|---|---|---|---|
| | ACTILEX B701 (anionic) | ACTILEX A801* (cationic) | Courtelle | Courtelle* | Carbon* |
| Diameter (micrometers) | 25.8 | 20.5 | 23.5 | 23.5 | 8.0 |
| | Electrical and electrokinetic data | | | | |
| Relative conductance+, ($\kappa_{meas}/\kappa_{pred}$) | 1.75 | 3.00 | 0 | — | $10^5$ |
| Zeta-potential, (millivolts) | +9 | −0.9 | −8.1 | +20 | 0 |
| | Filtration data: Non-electrophoretic capture | | | | |
| $\eta$exp | 0.00862 | 0.00173 | 0.00026 | 0.00951 | 0.0111 |
| $\eta$theory | 0.00849 | 0.0105 | 0.00922 | 0.00922 | 0.0258 |
| $\eta$exp/$\eta$theory | 1.02 | 0.17 | 0.03 | 1.03 | 0.43 |
| | Filtration data: Electrophoretic capture | | | | |
| m = $d\eta_E/dN_E$ | 0.374 | 0.187 | 0.020 | 0.207 | 0.025 |

*Surface modified using polyamide electroylte
+ Refers to a random fibrous mat of volumetric packing density 0.2 ± 0.02

REFERENCES

Happel, J., Brenner, H. 1965. Low Reynolds Number Hydrodynamics
Kuwabara, S. 1959. J. Phys. Soc. Japan 14(4):527
Spielman, L. A., Goren, S. L. 1968. Environ. Sci. Technol. 2(4):279
Joy, A. S., Natson, D., Botten, R. 1965. Research Techniques and Instrumentation 1(1):6
Fairbrother, F., Mastin, H. 1924. J. Chem. Soc. 75:2318,1494
Kotera, A., Furusawa, K., Takeda, Y. 1970. Kolloid-Z. 239:677
Van den Hull, H. J., Vanderhodd, J. W. 1972 J. Electroan. Chem. 37:161
Natanson, G. 1957a. Dokl. Akad. Nauk SSSR 112:100
Natanson, G. 1957b. Dokl. Akad. Nauk SSSR 112(4):696
Langmuir, I. 1942. Report on Smokes and Filters Sect. 1 U.S. Off. Sci. Res. Dev. 865:iv
Stechkina, I. B., Kirsch, A. A., Fuchs, N. A. 1969. Ann. Occup. Hyg. 12:1
Spielman, L. A., Fitzpatrick, J. A. 1973. J. Colloid Int. Sci. 42(3):607
Hough, D. B., White, L. R. 1980. Adv. Colloid Int. Sci. 14:3
Adamczyk, Z., van der Ven, T. G. M. 1981. J. Colloid Int. Sci. 84(2):497
Zebel, J. Colloid Int. Sci. 20, 522(1965)
Fitzpatrick, J. A., Spielman, L. A. 1973. J. Colloid Int. Sci. 43:350
Enolf, C. W., Carstensen, E. L. (1971), J. Phys. Chem. 75(8) 2636
Schwarz, G., (1962), J. Phys. Chem. 66 2636

We claim:

1. A method of depth filtration of particles from a fluid carrying particles including the steps of: providing in a deep filter a plurality of polymer filter medium elements that have an electrical conductivity that varies from one part to another part of each filter medium element, at least some of the elements being ionically conductive such that said ionically conductive elements have an ionic conductivity different than that of the fluid,
applying an electric field to said deep filter to cooperate with individual ones of said elements,
permitting or causing said fluid with the particles to flow into the deep filter and move therein, and
influencing movement of the particles in the deep filter by the electric field to enhance filtration of the particles from the fluid.

2. A method according to claim 1, wherein said providing step includes providing the polymer filter medium elements in the form of fibres.

3. A method according to claim 2 wherein said providing step includes providing manufactured fibres having within them one or more conductive parts of discontinuous longitudinal regions.

4. A method according to claim 2 in which the fibres are of polyacrylic material.

5. A method according to claim 1 including permitting or causing the polymer filter medium elements to have a specific state of charge, not the same as that of the particles to be filtered.

6. A method according to claim 1 including chemically treating the polymer filter medium elements to have an ionic charge opposite to that of the particles.

7. A method according to claim 1 including providing a deep filter of a filter medium of a bed or layer of significant depth but open structure to have a high porosity, such that when the electric field is not applied particles move through without encountering the polymer filter medium.

8. A method of depth filtration of particles from a fluid carrying particles including the steps of:
providing in a deep filter a quantity of polymer filter medium elements, at least some of the elements being ionically conductive,
applying an electric field to said deep filter to cooperate with individual ones of said elements,
permitting or causing said fluid and carried particles to flow into the deep filter and move therein,
influencing movement of the particles in the deep filter by the electric field to enhance filtration of the particles from the fluid, and
permitting or causing each of the polymer filter medium elements to imbibe water.

9. A method of depth filtration of a fluid carrying particles including the steps of:
providing a plurality of polymer filter medium elements having an electrical conductivity that varies from one part to another of said polymer filter medium elements, the electrical conductivity differing from that of the fluid, at least some of the polymer filter medium elements being ionically conductive, with an ionic conductivity different from the fluid,
forming a quantity of said polymer filter medium elements into a deep filter,
applying an electric field to cooperate with individual ones of said polymer filter medium elements in the deep filter,
permitting or causing the fluid carrying particles for filtration therefrom to flow into the deep filter and move therein,
influencing the movement of the particles in the deep filter by the cooperation of said applied electric field and said individual polymer filter medium elements to enhance filtration of said particles from the fluid.

10. A deep filter including:
a polymer filter medium arranged in a filter layer, the filter layer including polymer fibres having an electrical conductivity that varies from one part to another within each fibre,
means for applying an electric field to the layer, and
means for moving a liquid carrying particles for filtration through the layer, the polymer filter medium fibers being ion conductive so as to have an ion conductivity different from that of said liquid.

11. A deep filter according to claim 10 wherein the polymer fibres are loosely packed to provide a high porosity of up to 96.75% pore volume.

12. A deep filter according to claim 11 in which the ion conductivity of ones of said individual polymer fibres are not uniform from part to part of the individual fibres.

13. A deep filter according to claim 11, wherein each of the polymer fibres in the filter medium, in operation, imbibes water.

14. A deep filter according to claim 12, wherein the non-uniform conductivity is caused by the polymer fibres forming the filter medium being of different types.

15. A deep filter according to claim 10 in which the filter medium is of loosely packed polymer fibres, the fibres being substantially planar.

16. A deep filter according to claim 15, wherein the means for moving the liquid directs the liquid substantially in a direction perpendicular to the plane of said polymer fibres.

17. A deep filter according to claim 15 in which the deep filter is a polymer filter medium of a bed or layer of significant depth but open structure to have a high porosity and the porosity is such that when the electric field is not applied, particles could move through without encountering the filter medium.

18. A deep polymer filter according to claim 10, wherein the filter medium is anionic ion-exchange fibres.

19. A deep filter according to claim 18, wherein the fibres have ion-exchange surface which is in a hydroxide form.

20. A deep filter according to claim 10 in which the polymer filter medium been chemically set with electropositive groups.

21. A deep filter including a polymer filter medium arranged in a filter layer, means to apply an electric field to the layer and means to move through the layer a liquid with particles for filtration, the filter medium being polyacrylic fibres chemically modified and having electropositive groups applied thereto.

22. A deep filter according to claim 22 in which the polyacrylic fibres are cationic.

23. A deep filter according to claim 22 having a porosity of no more than 96.75%.

24. A deep filter according to claim in which the fibres are treated with sodium hydroxide to modify the fibre surface to hydroxide form.

25. A deep filter according to claim 21, wherein each of the polyacrylic fibres imbibes water.

26. A deep filter according to claim 21, wherein each of the fibres is ionically conductive.

27. A deep filter according to claim 22 in which the ion conductivity of individual ones of said fibres are not uniform from part to part of the fiber, the said filter medium being of ionically conductive fibres capable of imbibing water.

28. A deep filter according to claim 27 in which the fibres have an ionic conductivity higher than that of the liquid.

* * * * *